(12) United States Patent
Winiecki et al.

(10) Patent No.: US 8,903,409 B2
(45) Date of Patent: Dec. 2, 2014

(54) TRANSCEIVER ARRANGEMENT

(71) Applicant: Sequans Communications, Ltd., Reading (GB)

(72) Inventors: Thomas Winiecki, Reading (GB); Jackson Harvey, Savage, MN (US)

(73) Assignee: Sequans Communications, Ltd., Reading (GB)

( * ) Notice: Subject to any disclaimer, the term of this patent is extended or adjusted under 35 U.S.C. 154(b) by 0 days.

(21) Appl. No.: 13/687,735

(22) Filed: Nov. 28, 2012

(65) Prior Publication Data

US 2013/0217398 A1   Aug. 22, 2013

Related U.S. Application Data

(60) Provisional application No. 61/565,170, filed on Nov. 30, 2011.

(51) Int. Cl.
*H04W 72/00* (2009.01)
*H04B 1/00* (2006.01)
*H04L 5/00* (2006.01)
*H04W 72/04* (2009.01)

(52) U.S. Cl.
CPC .............. *H04W 72/04* (2013.01); *H04B 1/0057* (2013.01); *H04L 5/001* (2013.01)
USPC ......... 455/450; 455/101; 455/552.1; 375/267

(58) Field of Classification Search
CPC .. H04B 7/0413; H04B 17/004; H04B 7/0802; H04W 72/04; H04W 72/0453
USPC ......... 455/78, 79, 82, 88, 101–103, 120, 121, 455/450, 550.1, 552.1; 375/267, 299
See application file for complete search history.

(56) References Cited

U.S. PATENT DOCUMENTS 8,626,216 B2 * 1/2014 Higuchi et al. ............... 455/509
2012/0329407 A1 * 12/2012 Rousu et al. ................. 455/90.2

FOREIGN PATENT DOCUMENTS

EP      1 381 163 A1     1/2004
EP      2 693 644 A1     2/2014

OTHER PUBLICATIONS

European Search Report and Written Opinion in regards to European Patent Application No. EP 12 19 2271; Date of Mailing: Mar. 12, 2014.
"3$^{rd}$ Generation Partnership Project; Technical Specification Group Radio Access Network; Evolved Universal Terrestrial Radio Access (E-UTRA); Carrier Aggregation; Base Station (BS) radio transmission and reception (Release 10)", 3GPP Standard; 3GPP TR 36.808. 3$^{rd}$ Generation Partnership Project (3GPP), Mobile Competence Centre; 650, Route Des Lucioles; F-06921 Sophia-Antipolis Cedex; France, vol. RAN WG4, No. V1.7.0: pp. 1-27 (Oct. 9, 2011).

(Continued)

*Primary Examiner* — Nhan Le
(74) *Attorney, Agent, or Firm* — Hamilton, Brook, Smith & Reynolds, P.C.

(57) ABSTRACT

An arrangement for a transmitter and/or receiver which is adapted to allow carrier aggregation in a wireless communication system, comprising a plurality of radio frequency (RF) blocks, each of which is inherently adapted to operate substantially across (in the region of) one of the particular groups of frequency ranges. The number of groups may be 5 or less.

16 Claims, 3 Drawing Sheets

(56) References Cited

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 10)", 3GPP Standard; 3GPP TS 36.101. 3rd Generation Partnership Project (3GPP), Mobile Competence Centre; 650, Route Des Lucioles; F-06921 Sophia-Antipolis Cedex; France, vol. RAN WG4, No. V10.4.0: pp. 1-242 (Oct. 3, 2011).

"Report ITU-R M.2039-2 M Series Mobile, radiodetermination, amateur and related satellites services," 3GPP Draft; R-Rep-M.2039-2-2010-MSW-E, $3^{rd}$ Generation Partnership Project (3GPP), Mobile Competence Centre; 650, Route Des Lucioles; F-06921 Sophia-Antipolis Cedex; France, (May 27, 2011). Retrieved from the internet: URL http://www.3gpp.org/ftp/tsg_ran/WG4_Radio/TSGR4_64/Docs/.

\* cited by examiner

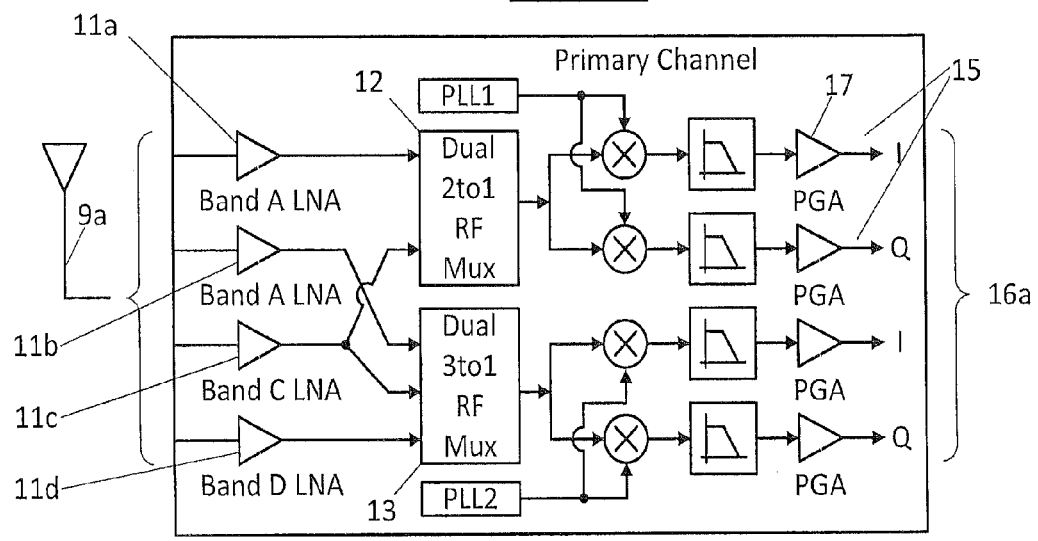
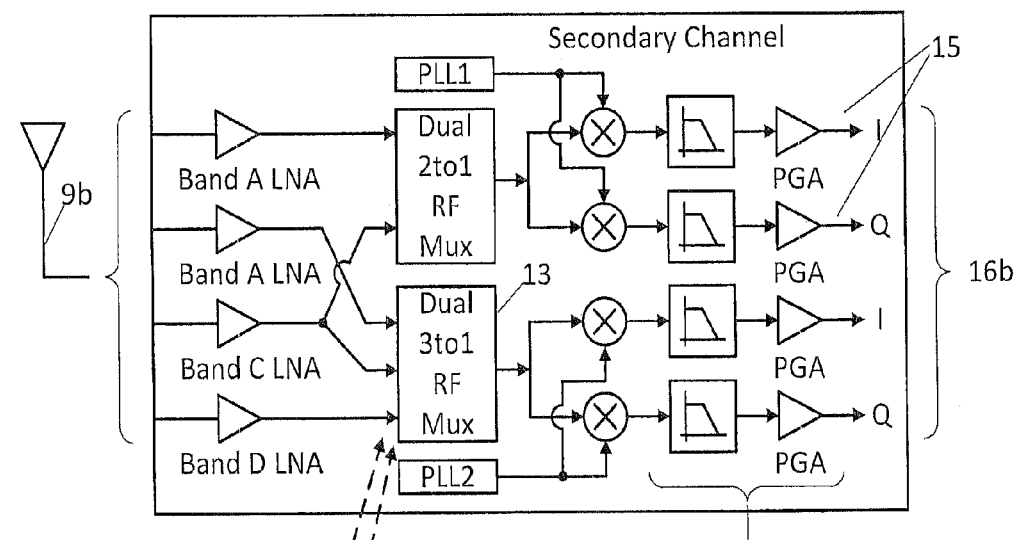
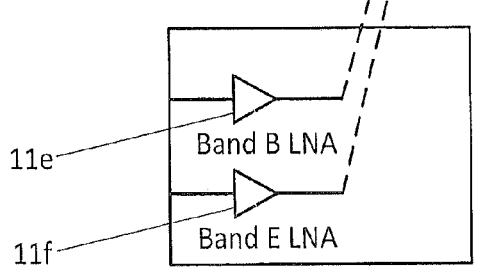
Figure 2 (a)
Figure 2 (b)

TRANSCEIVER ARRANGEMENT

RELATED APPLICATION

This application claims the benefit of U.S. Provisional Application No. 61/565,170, filed on Nov. 30, 2011. The entire teachings of the above application are incorporated herein by reference.

TECHNICAL FIELD

This disclosure relates to the general field of communication. Embodiments concern transmitter and/or receiver arrangements for communication systems which provide carrier aggregation. It has particular, but not exclusive application, to wireless multiple input/multiple (MIMO) communication systems, where transceivers (e.g. adapted for user equipment or base stations of cellular telecommunication networks) are provided with two or more antennas in order to increase transmit diversity.

BACKGROUND

Carrier aggregation provides an increase in data throughput capability by allowing different parts of the frequency spectrum to be combined logically to form a single channel (e.g. over-the-air interface between a base station and a user equipment). The technique of carrier aggregation thus allows an expansion of the effective bandwidth which can be utilized in wireless communication by concurrent utilization of radio resources across multiple carriers. Multiple component carriers are aggregated to form a larger overall transmission bandwidth. Carrier aggregation spreads the available signal power over a wider bandwidth, and greatly improves throughput for high-order modulation schemes.

The Third Generation Partnership Project (3GPP) has recently finalized the definition of "release 10" standard for radio core networks and service architectures. This standard introduces a number of features, including provision for data throughput in excess of 1 Gb per second. This is one of the International Mobile Telecommunication (IMT) advance requirements for a fourth generation (4G) communication standard. It proposes the use of carrier aggregation.

In one type of carrier aggregation scheme, contiguous carrier aggregation, those portions of the spectrum which are combined are adjacent. Alternatively, in non-contiguous carrier aggregation schemes, the portions of the spectrum which are combined are non-adjacent. Further, non-contiguous carrier aggregation can either be performed using channels within the same E-UTRA (Evolved UMTS Terrestrial Radio Access) frequency band which is referred to as "intra-band carrier aggregation", or using channels from different E-UTRA bands which is referred to as "inter-band carrier aggregation".

In modern cellular networks, base stations, often referred to as node Bs or evolved node Bs (eNBs), communicate with user equipment such as mobile phones, laptops and the like. Node Bs are conventionally controlled by network controllers, although in certain systems, node Bs (as well as user equipment) may be provided with a degree of autonomy and communicate with like node Bs or user equipments (peer-to-peer communications). Carrier aggregation may be performed in downlink, that is, from an eNB to user equipment (UE). Carrier aggregation can also be carried out in uplink; i.e. from a UE to an eNB. Typically, using carrier aggregation, up to 5 individual channels (called component carriers) can be combined leading to a combined 100 MHz spectrum width available for communication.

The hardware of transceivers used in base stations and user equipment is usually designed specifically for implementing a specific carrier aggregation scheme. The "front end" architecture of devices (e.g. transmitter and/or receiver arrangements of UEs) designed and adapted for 3GPP release 9 standards cannot perform any of the carrier aggregations schemes proposed in 3GPP release 10. Thus devices, such as user equipment adapted for the earlier standard, would not be able to significantly improve data throughput as they would be unable to implement the carrier aggregation schemes of release 10. Similarly devices, which are able to support the latest release 10 carrier aggregation schemes, require modification to support current schemes.

Depending on the country in which e.g. a UE is to be used, only certain bands of the spectrum are available (e.g. licensed) for use by cellular communication network operators. Different countries tend to use different bands (and combinations thereof) for cellular communication. This presents a problem when designing universal user equipment adapted to be used anywhere, and which can support a wide variety of carrier aggregation schemes. Because of the high number of combinations of bands available which supporting carrier aggregation schemes, it becomes an extremely difficult task to design circuitry (such as front end architecture) for transceivers (e.g. RF circuit blocks and amplifiers) of user equipments which are sold globally and which can support carrier aggregation of two or more bands.

Carrier aggregation can, in theory, be applied to any combination of channels and furthermore, in all available E-UTRA frequency bands. To implement a particular carrier aggregation scheme would require a bespoke transceiver design, adapted specifically for those particular E-UTRA frequency bands in the particular aggregation scheme. However, designing transceiver hardware which is able to support several different carrier aggregation schemes is a difficult task. One possibility would be to use multiple separate transceivers for each band, each transmitting and receiving a single component carrier. Data streams from each carrier would then be combined and processed. However it becomes expensive and unwieldy to provide RF blocks (e.g. RF amplifiers) for each possible band. Furthermore, this solution would require the front end architecture of transceivers to be duplicated to support intra-band carrier aggregation where the signal power arriving at the antennas cannot be split across the two transceivers. While such architecture is advantageous in terms of its flexibility and component reuse, it is clearly expensive in terms of component count and total footprint.

SUMMARY

Embodiments relate to transmitter and/or receiver arrangements which are able to support a large number of different carrier aggregation schemes. Examples have an efficient architecture in terms of compactness. An aim of some examples is to provide a transceiver arrangement which is highly flexible in terms of being able to support carrier aggregation schemes which use different combinations of bands, which at the same time minimizes the silicon area of transceiver chips, engineering bill of materials (EBOM) and printed circuit board (PCB) footprint.

In one aspect, there is provided an arrangement for a transmitter and/or receiver which is adapted to allow carrier aggregation in a wireless communication system, comprising a plurality of radio frequency (RF) blocks, each of which is inherently adapted to operate substantially across one of the following particular groups of frequency ranges, in MHz, of: A) 698-960; B) 1428-1660; C) 1710-2200; D) 2300-2690; E) 3400-3800.

The arrangement may be adapted, so that each of the RF blocks operates substantially across a different one of the groups of frequency ranges.

The arrangement may be further adapted for downlink, and the frequency ranges for groups A, B and C are in the region, in MHz, of: A) 728-960; B) 1476-1559; and, C) 1805-2200. The arrangement may be further adapted for uplink, and wherein the frequency ranges for groups A, B and C are in the region, in MHz, of: A) 698-915; B) 1428-1660; and C) 1710-2020.

The frequency ranges, may be such so as to at least span the following E-UTRA frequency bands, for each corresponding group:—A) 5, 6, 8, 12-14, 17-20; B) 11, 21, 24, C) 1-4, 9, 10, 23, 25, 33-37, 39; D) 7, 38, 40, 41; and, E) 42, 43.

The radio frequency blocks may comprise RF amplifiers. The RF amplifiers may be tuneable across the range of the group. The number of said groups the RF blocks are adapted for may be three. The RF blocks may be adapted for groups A, C and D. The arrangement may be adapted to operate in a multiple antennas and or a multiple input/multiple output (MIMO) system. The arrangement may be adapted to be able to provide inter-band carrier aggregation for any of the following carrier aggregation schemes, wherein the following letters represent the said groups into which the aggregated bands fall: A-A, A-C, A-D and C-D.

The arrangement may, for each channel/antenna, be provided with two RF amplifiers adapted for group A, and one RF amplifier adapted for groups C and one RF amplifier adapted for group D. The arrangement may be adapted to operate over two channels of a MIMO system, and having an input and/or output to the respective antenna of each channel.

The arrangement may be a receiver, wherein for each channel there are first multiplexing means to multiplex the output from one of the RF amplifiers adapted for group A, with the output from the RF amplifier adapted for group C, and second multiplexing means to multiplex the output from the other group A adapted amplifier with the output from the group C adapted amplifier and the output from the group D adapted amplifier.

The multiplexing may be performed after down-conversion of the outputs from the RF amplifiers. The arrangement may include, for each channel, one RF amplifier adapted for group E and/or one RF amplifier adapted for group B. The outputs from the amplifier(s) adapted for groups E and/or B may have inputs to said second multiplexing means.

The arrangement may provide intra-band carrier aggregation with respect to any band provided by the RF amplifiers. There may be means to feed the output of the band C to both multiplexing means simultaneously so as to support intra-band carrier aggregation for bands in frequency group C. The outputs of said multiplexers fed into IF support chains may be able to support IF paths of up to 100 MHz.

In another aspect is provided a user equipment or base station including such an arrangement.

BRIEF DESCRIPTION OF THE DRAWINGS

In the drawings:

FIGS. 2a and 2b show portions of compact receiver arrangements adapted to support a number of carrier aggregation schemes in a device having two antennas;

DETAILED DESCRIPTION OF THE INVENTION

Figure 1:
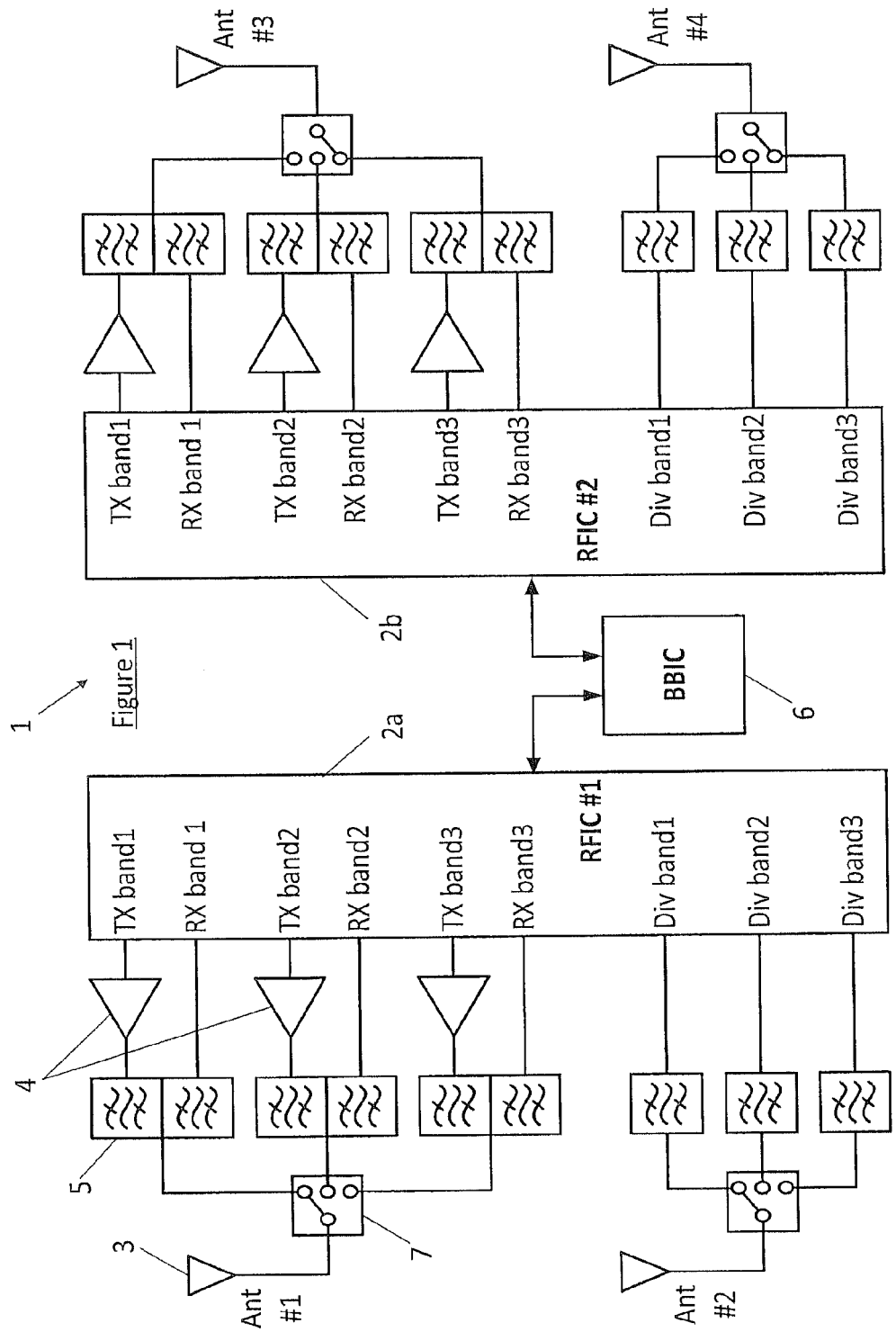
FIG. 1 shows a schematic layout of a transceiver arrangement adapted to support carrier aggregation in a MIMO system.

Referring to FIG. 1, a transceiver architecture 1, adapted to provide for two component carrier aggregation, uses two standard radio frequency integrated circuits (RFICs) 2a and 2b, both connected to a base band integrated circuit (BBIC) 6. RFIC 2a is used for communication in either band 1, 2, or 3 as selected by the switches 7 via a first antenna, Ant 1. A secondary antenna, Ant 3, is required for MIMO reception. A secondary RFIC (2b) can simultaneously receive and transmit another channel. This configuration allows inter-band carrier aggregation (RFICs operating in different bands) or intra-band carrier aggregation (both RFICs operating in the same band but different carriers). Circuitry, such as amplifiers 4 and filters 5, is provided for each band.

Various permutations of carrier aggregation can be supported with respect to bands 1, 2 and 3 with such a design. However, as mentioned, for each band, separate RF amplifiers and filters need to be provided. There are more than thirty different designated E-UTRA bands which are available for carrier aggregation. As mentioned only certain combinations of these bands are available for use by cellular network operators in particular countries. It becomes impractical to duplicate such circuitry to support a large number of possible aggregation schemes. So while such architecture has advantages in terms of its flexibility, it is expensive in terms of component count, chip area and thus footprint of the printed circuit board. It would therefore be costly and unfeasible to support carrier aggregation of all possible bands within the same RF circuit block of a transceiver using such conventional designs.

Modern RF circuit blocks (e.g. RF amplifiers) can be provided by low cost CMOS transceiver designs. Furthermore, they can be made flexible enough to work across a range of designated bands rather than just a single band. Such RF amplifiers e.g. can be inherently adaptable or tunable to work across a range of frequencies to support a plurality of bands.

It is to be noted that all carrier aggregation schemes that have been included in the 3GPP release 10 (TS36.101) and also all carrier aggregation scenarios proposed by 3GPP for inclusion in release 11 combine two component carriers, and carrier aggregation has only been proposed in the downlink direction. This allows certain efficiencies to be made to systems and designs supporting these schemes such as requiring only one transmitter (including power amplifier) for each supported E-UTRA band.

The inventors have determined that all the current and proposed E-UTRA bands for use in carrier aggregation schemes in release 11 can be grouped into a small number of groups having particular frequency ranges. In other words, by grouping all the available E-UTRA bands into a limited number of selected groups (according to their frequency), the wide range of carrier aggregation schemes/scenarios is reduced to a smaller subset of possibilities.

Furthermore, the particular groups have been determined and selected such that low cost RF circuit blocks, such as RF amplifiers, can be provided which are flexible enough to work across the range of the frequency groups, and provide amplification for a plurality of bands rather than just a single band. As a result, transceiver arrangements and designs are provided which utilize only a limited number of different RF amplifiers. Furthermore, by cleverly grouping bands and using a limited number of different RF amplifiers, transceivers can be provided having just a few RF amplifiers, but which nonetheless support a wide range of carrier aggregation schemes.

The table below shows a frequency grouping showing groups A, B, C, D and E. The various E-UTRA bands (e.g. those proposed for use in aggregation schemes) have been grouped into these five groups A, B, C, D and E shown in the $2^{nd}$ column. The limited number of groups (5) is significantly smaller than the number of E-UTRA bands. The $3^{rd}$ and $4^{th}$ columns of the figure showed preferred refinements of the frequency ranges of the groups for downlink and uplink use respectively.

| Frequency group | E-UTRA bands | Downlink frequency range (MHz) | Uplink frequency range (MHz) |
|---|---|---|---|
| A | 5, 6, 8, 12-14, 17-20, 26 | 728-960 | 698-915 |
| B | 11, 21, 24 | 1476-1559 | 1428-1660 |
| C | 1-4, 9, 10, 23, 25, 33-37, 39 | 1805-2200 | 1710-2020 |
| D | 7, 38, 40, 41 | 2300-2690 | 2300-2690 |
| E | 42, 43 | 3400-3800 | 3400-3800 |

In the various proposed two-component inter-band aggregation schemes, one band from one group is aggregated with one band from another group. By considering carrier aggregation in terms of groups rather than bands, it reduces the possible permutations of the aggregation schemes. As RF blocks such as RF amplifiers can be adaptable across the frequencies of the selected groups, it reduces the number of different RF amplifiers which need to be provided; e.g. to just 5 different ones, it also allows for a reduction in their overall number by appropriate arrangement, as will be described in further detail hereinbelow.

As the table indicates E-UTRA bands 5, 6, 8, 12-14, 17 to 20 and 26 are grouped in the frequency group A. Similarly the table shows frequency groups designated B, C, D and E, which support the E-UTRA bands listed in the second column. The third and fourth columns of the table show preferred downlink frequency ranges and uplink frequency ranges respectively (in Megahertz). Depending on whether the transmitter and/or receiver arrangements are designed for uplink or downlink, the frequency ranges in the groups vary slightly as shown. It should be noted that the frequency ranges of the above groups A, B, C, D and E in the table are just given as an example, and it would be clear to the skilled person that examples may be implemented somewhat differing frequency ranges for each group. In other words, the ranges for each group in the table are not hard fast, but just an indication of the general region of range for each group; they may be varied somewhat and the skilled person would readily envisage slightly different ranges.

The aforesaid grouping shown in the table is convenient as it further allows RF circuit blocks (e.g. RF amplifiers for use in a transceiver) to be made flexible enough to operate in any of the bands within one of the above listed (frequency) groups. So, an RF amplifier, such as low noise amplifier (LNA), can be provided which is tunable or inherently adaptable to operate at any frequency of the bands within the group; i.e. it can support any of the bands within the same frequency group. Therefore as mentioned, only a few different RF amplifier designs need be provided to support all bands. Moreover, by suitable arrangement of RF amplifiers in a transmitter or receiver, and using appropriate multiplexing, only a relatively small number need be provided to support a wide range of different carrier aggregation schemes.

It is further important to note that by the particular selection of grouping frequencies in the table, all the carrier aggregation scheme scenarios proposed by 3GPP (and requested by operators) fall into the particular limited number of categories listed below:
i) Intra-band contiguous carrier aggregation; or
ii) Inter-band carrier aggregation of the following schemes Carrier Aggregation A-A, Carrier Aggregation A-C, Carrier Aggregation A-D, or Carrier Aggregation C-D, where A, C and D relates to the frequency groups in the table.

Thus the above notation Carrier Aggregation G1-G2 denotes that bands from frequency group G1 and G2 are aggregated. 3GPP uses the notation Carrier Aggregation X-Y for specific band numbers X and Y, e.g. Carrier Aggregation 5-12 for aggregation of bands 5 and 12.

Thus the notation has thus been extended here to band groups.

This is highly convenient and fortuitous as it enables in examples, a further reduction in the number of different RF blocks (RF amplifiers) needed for transmitter or receiver designs to support the above said carrier aggregation schemes. Furthermore, in certain examples by appropriate arrangement, a very efficient, low cost, transceiver arrangement can be provided which utilises a significantly reduced overall (minimum) number of RF blocks (e.g. RF amplifiers). This is particularly significant when compared with an architecture which proposes using separate RF amplifiers for each band (and for each channel of a MIMO system).

Referring to FIG. 2, an example benefits and utilizes the grouping of E-UTRA bands are according to the aforementioned groups. FIG. 2 shows a portion of a receiver arrangement (10) adapted to support carrier aggregation in a MIMO system which utilizes two antennas (9a, 9b), one for each channel. This arrangement also supports the schemes listed in (i) and (ii) above in relation to the proposed 3GPP carrier aggregation schemes; i.e. it supports intra-band carrier aggregation as well as inter-band aggregation of bands within groups A, C and D as designated.

The diagram shows schematically a portion of a receiver arrangement 10; this portion is often referred to as "front end". Such a receiver arrangement may be incorporated into user equipment such as a mobile device. The receiver arrangement is shown divided into two circuit blocks 16a and 16b as shown. Although shown separately for clarity, in one example, they are integrated on the same IC chip. The upper circuit block 16a shows receiver circuitry associated with a primary antenna 9a in respect of a primary channel, and the lower circuit block 16b shows receiver circuitry associated with a second antenna 9b in respect of a second (diversity) channel Thus the receiver is adapted for downlink MIMO operation. It is to be noted that circuit blocks 16a and 16b are substantially identical in design. Therefore, any reference to one of the circuit blocks is appropriate to the other.

Each circuitry block is provided with four input amplifiers 11, seen in the left hand side of the figure. In the particular examples, these are Low Noise Amplifiers (LNAs). There are two LNAs provided for band A, (designated as Band A LNAs, 11a and 11b). There is further provided one LNA for band C (11c) and one LNA for band D (11d). In the embodiment shown, band A LNAs, 11a and 11b are adapted to provide amplification with respect to any bands within frequency group A. In an example this is achieved by the band A LNA being tunable substantially across the frequency range of group A. Similarly the band C and the band D LNA's are adapted to be tunable with respect to the frequencies (and corresponding bands) in groups C and D respectively. The inputs from each of the LNA's are connected to an antenna 9a. Two antennas are provided; one for the primary channel and the other for the secondary channel, each feeding into the respective four LNAs.

The outputs of the four LNAs are fed into two multiplexers 12 and 13 as shown. Multiplexer 12 is a dual 2-to-1 RF multiplexer and multiplexer 13 is a dual 3-to-1 RF multiplexer. Inputs to the multiplexers are arranged such that the output from Band A LNA 11a can be multiplexed with the output from Band C LNA 11c at multiplexer 12. Furthermore the outputs from Band A, Band C and Band D LNAs 11b, 11c and 11d can be multiplexed at multiplexer 13.

After the outputs from the LNAs are multiplexed together, they are then fed into two IF (intermediate frequency) chains 14 shown on the right of the figure to produce phase and quadrature (I and Q) signals 15. The IF chains include phase locked loops (PLLs) PLL1 and PLL2. Programmable gain amplifier (PGA) amplifiers 17 are also provided.

Thus, for each channel there is therefore provided, two amplifiers (with two respective antenna inputs) adapted for within group A, and one amplifier each (each with an antenna input) adapted for bands within groups C and D respectively.

In order, for example, to aggregate bands in group C and D, Band C LNA 11c is enabled in the 2-to-1 multiplexer 12, to band group in C LNA whilst the 3-to-1 multiplexer 13 is set to enable the output from Band D LNA 11d.

The above described example supports all the inter-band carrier aggregation scenarios listed in (ii) above. Furthermore this is achieved with just four LNAs.

The receiver architecture in this example, also allows receiving a single carrier in band group A on four separate antennas (4-layer MIMO in downlink) when connecting the four band A LNAs to four separate antennas. In such an example there may be provided an additional channel for each of the two circuit blocks 16a and 16b.

It is further to be noted that intra-band non-contiguous carrier aggregation can easily be supported for bands in frequency group C when the output of the band C LNA is fed to both multiplexers 12 and 13 simultaneously, In such a case, the LNA can be specified to work correctly to supply two mixers in parallel.

The FIG. 2a omits circuitry for bands with groups B and E for clarity purposes. If E-UTRA bands from groups B and group E are to be additionally used, RF amplifiers (such as LNAs) adapted for the respective groups can be provided along with the LNAs for bands A, C and D. FIG. 2b (along with FIG. 2a) shows how additional circuitry may be provided, in a further example, to additionally utilize bands from groups B and E. FIG. 2b shows additional circuitry which can be added to the circuitry of FIG. 2a without substantial redesign or reconfiguration. It shows LNAs for groups B and E (11e and 11f respectively). In an example, the outputs of these can simply be multiplexed into the bottom RF chain by connection to multiplexer 13. This is preferably realized efficiently by replacing the 3-to-1 multiplexer with a 5-to-1 multiplexer (with respect for both primary and secondary channels).

Support for the all the proposed aggregation schemes proposed by 3GPP including the use of a bands in groups A and E are thus realized by having one pair of RF amplifiers and inputs therefor, for each frequency group B, C, D and E, and two pairs of RF amplifiers and inputs for frequency group A. By selecting and designating frequency groups as shown, and providing an arrangement whereby the RF amplifiers are adapted to support any band within a particular frequency group, all bands can be supported for carrier aggregation.

Furthermore the design provides for all inter-band carrier aggregation schemes defined in release 10 and proposed for release 11 of 3GPP. Furthermore, examples such as the one described above, reduce multiplexing options and thus reduce the technically challenging task of multiplexing RF signals. To down-convert carriers, two independent PLLs are provided, labelled PLL1 and PLL2 in FIG. 2. A third PLL may be used for the transmitter (not shown).

The RF chains (e.g. components such as PLLs, filters and amplifiers) are adapted in examples to support 40 MHz channels. In other words intra-band contiguous carrier aggregation is supported by widening the RF paths from 20 MHz (maximum single carrier width) to 40 MHz (maximum aggregated width). This may be realized by e.g. having each of the phase and quadrature (I and Q) portions of the chain, support 20 MHz; the I and Q paths are thus preferably wide enough to support contiguous carrier aggregation for up to two 20 MHz carriers. So, in some examples where a direct conversion quadrature scheme is utilized, both I and Q paths are widened from 10 MHz to 20 MHz.

It is to be noted that multiplexing between different inputs may also be done after the down conversion stage. In such examples, down-converters can be made more narrow band, but the number of down sampling mixers increases.

To further enable selection of particular E-UTRA bands within these groups, further switches in the front end architecture may be provided so that different bands in the same group can all be routed to the same MIMO pair of antennas.

Especially in handheld user equipment, the number of antennas is advantageously kept to a minimum. Inter-band carrier aggregation can be supported with a single pair of antennas by using signal diplexers to route receive signal power at different frequencies to separate RF inputs on the transceiver chip. Even for inter-band carrier aggregation cases where the carrier frequencies are relatively close, dedicated multiplexing filters may be used.

Figure 3:
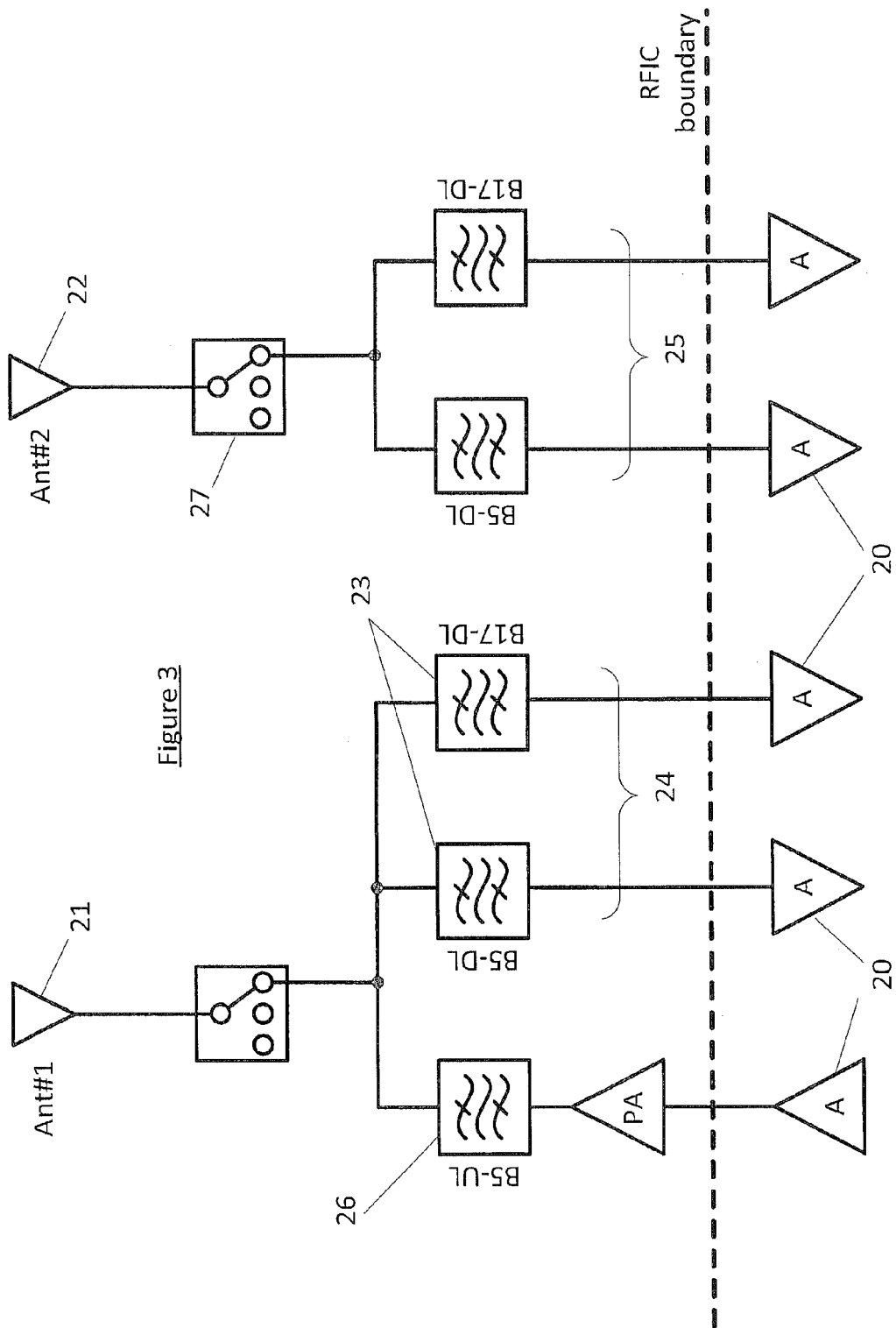
FIG. 3 shows an adaptation of front end circuitry.

FIG. 3 illustrates an example which supports the carrier aggregation scheme CA_5-17. A single pair of antennas can be made to be sufficient by having two separate MIMO pairs of RF inputs 24 and 25 for frequency group A for example. Both of bands 5 and 17 are in frequency group A. With an appropriate set of duplexers, two antennas 21 and 22 tuned to the frequency region A, via switching means 27, are sufficient to receive both bands in parallel. Instead of a single filter 26 (as is used for uplink for band 5) connected to an antenna, two filters and duplexers for bands 5 and 17 may be used or a quadplexer supporting downlink and uplink frequencies of both bands.

The above describes examples of receiver arrangements adapted for supporting carrier aggregations. However, similar arrangements can be used in providing transmitter and/or transceiver arrangements and such examples would readily be envisaged by the skilled person.

The examples described allow transmitter and/or receiver arrangements to be provided which have a high degree of flexibility, and furthermore which support current and proposed carrier aggregation schemes. Furthermore, examples can allow for future carrier aggregation schemes to be supported.

Examples can further be readily and simply adapted by adding more RF inputs/RF amplifiers, and by providing appropriate multiplexing options added as necessary. In certain examples, RF circuitry and baseband/analogue section are provided on different IC chips. This has the advantage that only the RF circuitry (chip) needs to be upgraded should the transmitter or receiver be adapted for an additional (future) carrier aggregation schemes.

The disclosure allows an efficient design of transmitter and/or receiver arrangement which can support various carrier aggregation schemes. It provides a high degree of flexibility by providing an arrangement which is adapted to cater for several carrier aggregation schemes where only selected bands may be available for carrier aggregation, without a considerable increase in the circuitry complexity or silicon area of RF transceivers. Furthermore embodiments of transceivers according to the invention do not have unduly increased complexity, thus the cost and footprint of chip and PCB is reduced. At the same time, embodiments maintain flexibility in the transceiver arrangements to allow for future evolution of aggregation schemes according to market requirement.

The skilled person will readily understand that the invention covers a variety of different embodiments. Embodiments can be adapted easily to provide for specific carrier aggregation schemes. Various switching and multiplexing options would readily be envisaged by the skilled person to implement various embodiments. Embodiments are applicable to MIMO schemes having more than two antennas, e.g. schemes having a primary antenna and two or more transmit diversity antennas.

What is claimed is:

1. An arrangement for a receiver which is adapted to allow carrier aggregation in a wireless communication system, comprising a plurality of radio frequency (RF) blocks, each of which is inherently adapted to operate substantially across one of the following particular groups of frequency ranges, in MHz, of:
   A) 698-960;
   B) 1428-1660;
   C) 1710-2200;
   D) 2300-2690;
   E) 3400-3800;
   the arrangement being adapted to operate in a multiple antennas and/or a multiple input/multiple output (MIMO) system, wherein, for each channel/antenna, there are provided two RF amplifiers adapted for group A, one RF amplifier adapted for group C and one RF amplifier adapted for group D, the arrangement further adapted to operate over two channels of a MIMO system, and having an input and/or output to the respective antenna of each channel; wherein for each channel there is a first multiplexer to multiplex the output from one of the RF amplifiers adapted for group A, with the output from the RF amplifier adapted for group C, and a second multiplexer to multiplex the output from the other group A adapted amplifier with the output from the group C adapted amplifier and the output from the group D adapted amplifier.

2. The arrangement of claim 1 further adapted for downlink, and wherein the frequency ranges for groups A, B and C are in the region, in MHz, of:
   A) 728-960;
   B) 1476-1559;
   C) 1805-2200.

3. The arrangement of claim 1 further adapted for uplink, and wherein the frequency ranges for groups A, B and C are in the region, in MHz, of:
   A) 698-915;
   B) 1428-1660;
   C) 1710-2020.

4. The arrangement of claim 1, wherein said frequency ranges are such so as to at least span the following E-UTRA frequency bands, for each corresponding group:
   A) 5, 6, 8, 12-14, 17-20;
   B) 11, 21, 24;
   C) 1-4, 9, 10, 23, 25, 33-37, 39;
   D) 7, 38, 40, 41;
   E) 42, 43.

5. The arrangement of claim 1 wherein said radio frequency blocks comprise RF amplifiers.

6. The arrangement of claim 5 wherein said RF amplifiers are tunable across the range of the group.

7. The arrangement of claim 1, wherein the RF blocks are adapted for three groups.

8. The arrangement of claim 7, wherein the RF blocks are adapted for groups A, C and D.

9. The arrangement of claim 8 which is adapted to provide inter-band carrier aggregation for any of the following carrier aggregation schemes, wherein the following letters represent said groups into which the aggregated bands fall: A-A, A-C, A-D and C-D.

10. The arrangement of claim 1 further arranged such that the multiplexing is performed after down-conversion of the outputs from the RF amplifiers.

11. The arrangement of claim 1, further including, for each channel, one RF amplifier adapted for group E and/or one RF amplifier adapted for group B.

12. The arrangement of claim 11 wherein the outputs from the amplifier(s) adapted for groups E and/or B have inputs to a multiplexer.

13. The arrangement of claim 1, which provides intra-band carrier aggregation with respect to any band provided by the RF amplifiers.

14. The arrangement of claim 1, having means for feeding the output of the band C RF amplifier to both multiplexers simultaneously so as to support intra-band carrier aggregation for bands in frequency group C.

15. The arrangement of claim 1, having outputs of said multiplexers fed into IF support chains able to support IF paths of up to 100 MHz.

16. A user equipment or base station including an arrangement as claimed claim 1.

* * * * *